United States Patent [19]

Burger

[11] 4,409,179
[45] Oct. 11, 1983

[54] PRESSURIZED CORE SHROUD FOR ALIGNING A NUCLEAR REACTOR CORE

[75] Inventor: Joseph M. Burger, Granby, Conn.
[73] Assignee: Combustion Engineering, Inc., Windsor, Conn.
[21] Appl. No.: 214,162
[22] Filed: Dec. 8, 1980
[51] Int. Cl.³ .............................................. G21C 5/08
[52] U.S. Cl. .................................. 376/302; 376/303; 376/304; 376/287
[58] Field of Search .............. 376/287, 292, 302, 304, 376/463, 303; 176/85, 87

[56] References Cited

U.S. PATENT DOCUMENTS

| | | | |
|---|---|---|---|
| 3,100,188 | 8/1963 | Fraas et al. | 376/304 |
| 3,215,608 | 11/1965 | Guenther | 376/302 |
| 3,247,076 | 4/1966 | Tutte et al. | 376/292 |
| 3,708,393 | 1/1973 | Waymire et al. | 376/302 |
| 3,753,856 | 8/1973 | Ash | 376/302 |
| 3,755,078 | 8/1973 | Stelle | 376/302 |
| 4,073,685 | 2/1978 | Brown et al. | 376/302 |
| 4,135,974 | 1/1979 | Garkisch et al. | 376/302 |

FOREIGN PATENT DOCUMENTS 572599 4/1959 Belgium ............................ 176/85

*Primary Examiner*—Richard E. Schafer
*Attorney, Agent, or Firm*—L. James Ristas

[57] ABSTRACT

A core shroud including flexible panels sealingly attached to the inner surface of the shroud at an elevation opposite the fuel assembly grids nearest the core midplane. Each panel forms the outer wall of a deformable chamber which is pressurized through a conduit carried by the shroud. One end of the conduit is in fluid communication with the reactor coolant at a high pressure location remote from the panels, producing a pressure differential across the panel which urges the panel against the adjacent grid to prevent core bowing.

12 Claims, 4 Drawing Figures

PRESSURIZED CORE SHROUD FOR ALIGNING A NUCLEAR REACTOR CORE

BACKGROUND OF THE INVENTION

This invention relates to nuclear reactors and more particularly to structure for maintaining the core in proper alignment during reactor operation.

A typical modern nuclear power reactor contains over two hundred elongated fuel assemblies supported in close side-by-side relationship within a nuclear reactor vessel. Th assemblies as a group are typically referred to as a nuclear reactor core, which produces heat as a result of the nuclear chain reaction. The reactor vessel has an inlet nozzle for introducing the cooling medium, typically water at a pressure of over 2000 psi, into the upstream end of the core. The water absorbs heat as it traverses the core and then exits the vessel to directly or indirectly drive a turbine.

In order to operate the reactor core safely, the power distribution must be carefully controlled to avoid local power peaking. Maintaining proper spacing between individual fuel assemblies is an important factor in maintaining a satisfactory power distribution. Safe operation also requires that the control rods, which are used to shut down the nuclear chain reaction, always have an uninterrupted path should they be inserted into or between the fuel assemblies. Any distortion in the shape of or separation between fuel assemblies could prevent proper insertion of the control rods. It may thus be appreciated that the shape of the nuclear reactor core and the spacing between individual assemblies must be maintained.

Despite careful design to prevent distortion of fuel assemblies during operation, a condition known as fuel assembly bowing has occasionally ben observed in operating reactors. Although all the factors contributing to bowing are not fully understood, it is believed that a combination of factors including the relatively low lateral stiffness of the fuel assemblies, the cross flows existing in the core, and the compressive forces on the assemblies provided to hold them down against the flow forces, give rise to the bowing problem. Bowing may occur on an individual fuel assembly, but core bowing has also been observed. Because of the spacing between the perimeter of the core and the closest rigid structure such as the core shroud, and the spacings between individual fuel assemblies, an imbalanced but steady force, such as an asymetry in the core flow, tends to distort all the assemblies in the same direction. This results in a substantial bowing of the core such that one side of the core is concave and the other is convex.

SUMMARY OF THE INVENTION

It is an object of the present invention to provide simple, passive means for counteracting the bowing of the core, by reducing the space available for the core to distort laterally. It is a further object to decrease this space available for distortion only during core operation so that during core outages, such as refueling, the space will be available for easy replacement or rearrangement of the fuel assemblies.

According to the invention, it is recognized that the core shroud provided in the conventional power reactors may be modified to utilize pressure differentials existing in the reactor vessel such that the desired antibowing function is provided during reactor operation, but nullified during reactor outages. The invention contemplates a new core shroud design and core antibowing system, including a core shroud mounted in the reactor vessel, the shroud including a frame having an inner surface closely conforming in shape to the lateral perimeter of the core. A flexible panel is sealingly attached along its edges to the inner surface of the frame to form a chamber between the panel and the frame. A conduit is provided having a first end opening into the chamber and a second end in fluid communication with the reactor coolant at a location remote from the panel, preferably at the upstream end of the core. During reactor operation when reactor coolant is flowing, the pressure at the upstream end of the core is higher than the pressure acting on the outer surface of the panel adjacent the core, producing a pressure differential across the panel which urges the panel inwardly against the core. Preferably, the panels are located at an elevation corresponding to the fuel assembly grids at approximately the core midplane. Thus during reactor operation the flexible panel occupies the space between the shroud and the adjacent peripheral fuel assembly and accordingly inhibits the lateral movement of the peripheral assembly. Although individual fuel assemblies in the core interior may experience slight bowing, the present invention prevents the cummulative effects of bowing from distorting the entire core.

DESCRIPTION OF THE PREFERRED EMBODIMENT

Figure 1:
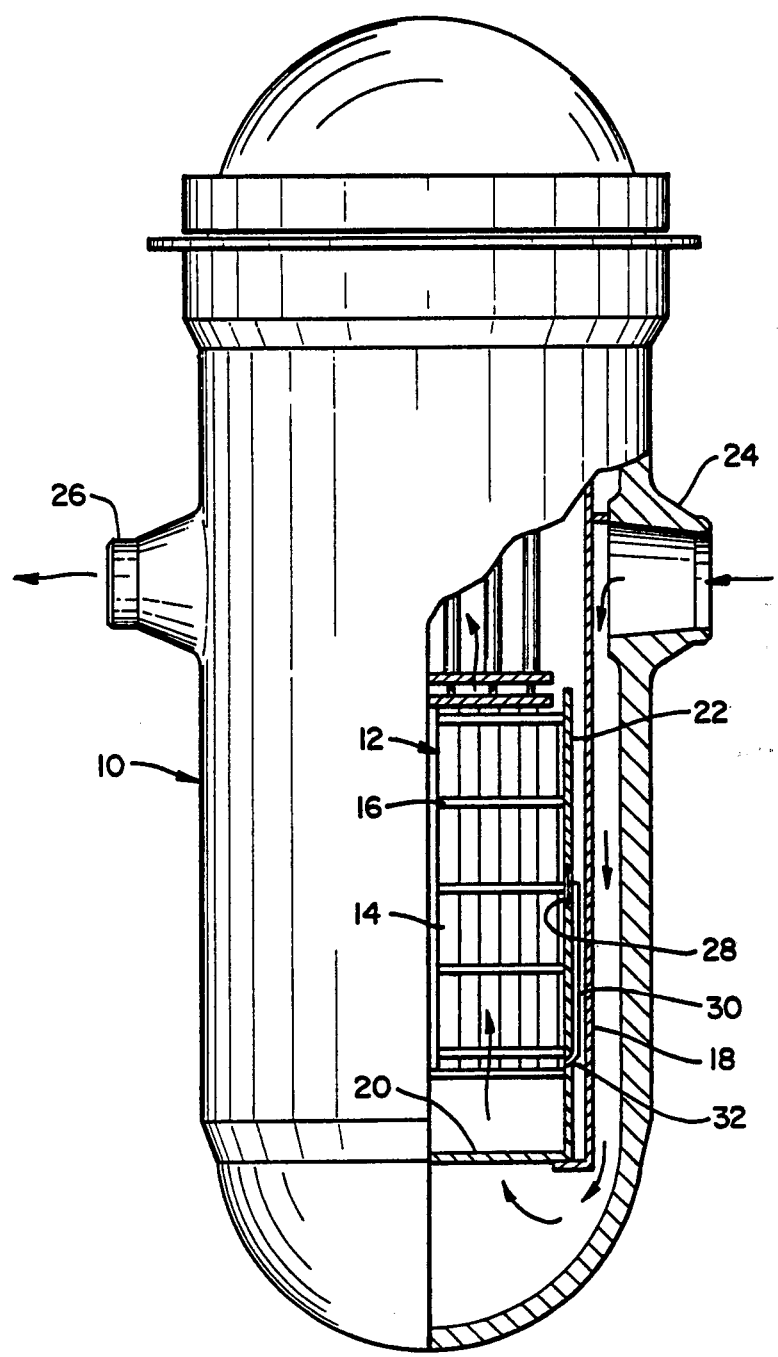
FIG. 1 is a partial cutaway, elevation view of a nuclear power reactor that embodies the present invention.

FIG. 1 shows a nuclear reactor vessel 10 partially cutaway to reveal the nuclear reactor core 12 consisting of a plurality of elongated, closely spaced fuel assemblies 14. Each fuel assembly typically includes a plurality of axially spaced grids 16 which support and space the individual fuel rods (not shown). The core is supported by a core barrel 18 and perforated core support stand 20, and is closely surrounded by a core shroud 22. During reactor power operation, a flow of reactor coolant enters the vessel through nozzle 24, travels downward along the core barrel 18 and is directed upward through the stand 20 where it enters the upstream end of the core 12. As the coolant passes over the core 12 the structure of the core produces a significant pressure drop which is approximately linear with distance from the upstream to the downstream end of the core. After exiting the core, the heated coolant leaves the vessel through outlet nozzle 26 and is carried to additional heat exchange equipment (not shown).

In accordance with the present invention, the core shroud 22 is provided with flexible panels 28 which are deflected by pressurized fluid through a conduit 30 having one end at a location 32 remote from the panels. Since the pressure at the remote location 32 is higher than the pressure at the elevation of the panel 28, the flexible panel bulges inwardly towards the core 12 and provides the lateral support to prevent core bowing. Preferably the panel 28 is located opposite the grids 16 nearest the core midplane.

Figure 2:
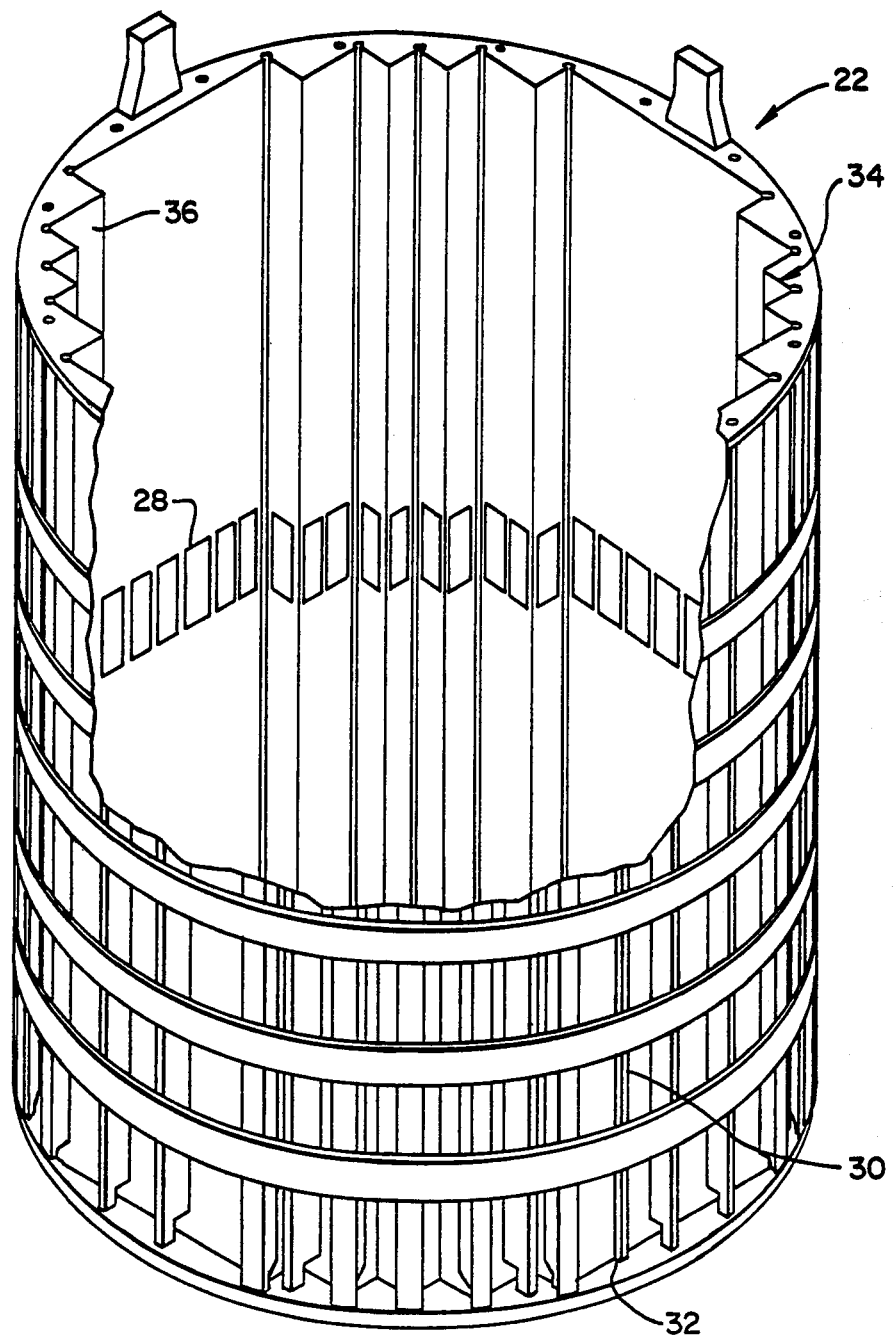
FIG. 2 is an oblique, partially cutaway view of a core shroud that embodies the present invention.

FIG. 2 shows the core shroud 22 in more detail where it may be seen that the shroud comprises an elongated, hollow frame 34 having an inner surface 36 closely conforming in shape to the lateral perimeter of the core. Typically the core and the inner surface of the shroud are generally cylindrical as approximated by the packed array of square fuel assemblies. At approximately the shroud midplane corresponding to the core midplane (See FIG. 1), a panel 28 is provided to register with each of the midplane grids 16 on the peripheral fuel assemblies of the core 12.

Figure 3:
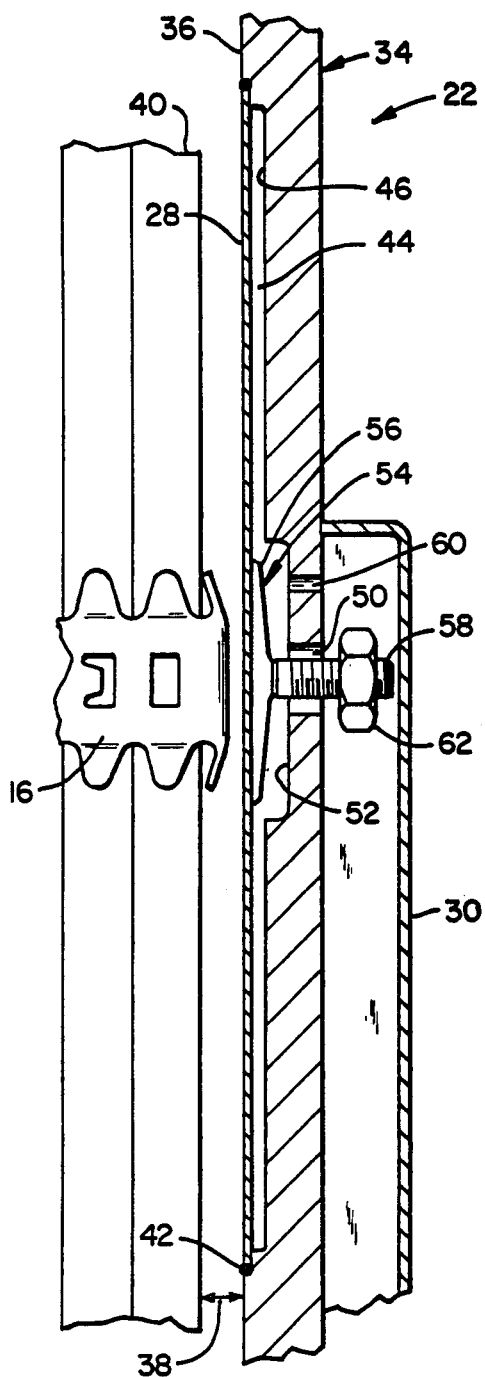
FIG. 3 is a schematic view of the portion of the shroud having the flexible panel adjacent to a peripheral fuel assembly.

FIG. 3 shows in greater detail the relationship between the shroud plane 28 and the fuel assembly grid 16. The shroud 22 is typically a very large, rigid, stainless steel structure which cannot be fabricated to tolerances tight enough to provide a close fit against the fuel assemblies of the core. Therefore, a gap or space 38 between the shroud frame 34 and the adjacent peripheral fuel rods 40 or grids 16 will exist over the inner surface 36 of the shroud. The present invention eliminates this gap 38, particularly at the elevation where fuel assembly bowing is most severe, by providing a flexible steel panel 28 sealingly attached as by welding along its edges 42 to the inner surface 36 of the shroud frame 34 to form a chamber 44 between the panel 28 and the frame 34. Preferably, the frame inner surface 36 is slightly recessed 46 and the panel may be welded or otherwise sealed along the edges of the recess.

Conduit means 30 having a first end 50 opening into the chamber 44 and a second end 32 (See FIGS. 1 and 2) adapted for fluid communication with the reactor coolant at a location remote from the panel, are also provided. The conduit preferably extends along the outer surface of the shroud 22 to a location at the upstream end of the shroud where it is exposed to the coolant pressure of the upstream end of the core, as shown in FIG. 1. The pressurization of the chamber 44 occurs passively and automatically. Furthermore, all the structure required to implement the invention is carried by the shroud 22 itself.

In the illustrated embodiment, the recessed surface 46 behind the chamber 44 is counter bored 52 to receive a stop assembly 54 which limits the movement of the panel 28. A bracket 56 including a threaded bolt 58 is attached to the chamber side of the panel 28 such that the bolt extends through the opening 50 and is free to reciprocate therein. A nut 62 is secured to the bolt 58. During shop assembly and trial fitting of the shroud 22 in the reactor, the nut 62 is preset to limit the travel of the panel 28 such that the desired total core envelope is achieved when all the panels are pressurized. This permits coordination of the deflection of all panels 28 in the core and in effect permits closer tolerances on the core envelope than are available on the core shroud as conventionally fabricated.

Figure 4:
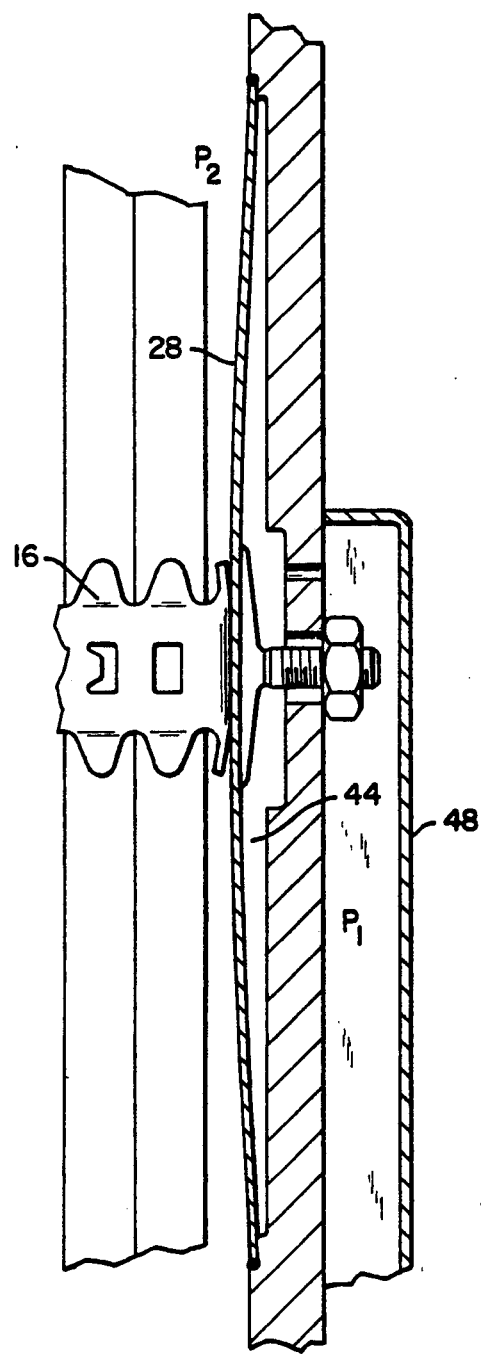
FIG. 4 is a schematic view similar to FIG. 3 showing the panel in the actuated position as it bears against the adjacent fuel assembly grid.

In the embodiment shown in FIGS. 3 and 4 the stop means 54 penetrate the shroud frame 34 through opening 50. In the event the panel 28 is fully deflected to the stop limit, the nut 58 may substantially cover the opening 50 causing a slight pressure drop in the chamber 44. To prevent pressure instability or oscillation in the chamber, an additional port 60 is provided between the conduit 30 and the chamber 44.

Although other embodiments are within the scope of the invention, all embodiments rely on the pressure difference between two separated points along the coolant flow path to effect a displacement of a portion of the core shroud immediately adjacent to the peripheral fuel assemblies such that a select portion of the core shroud is urged towards the assembly. FIG. 4 schematically shows a panel 28 in the actuated position where the pressure $P_1$ in the conduit 30 and the chamber 44 is higher than the pressure $P_2$ existing on the face of the panel 28 adjacent the fuel assembly grid 16. So long as a significant reactor coolant flow is maintained, a pressure differential will exist across the panel. During reactor outages, such as the refueling period, the coolant flow will cease and the pressure diffential will be zero. The panel will return to its original shape as shown in FIG. 3, and the adjacent fuel assembly may be removed for inspection or replacement.

It will be appreciated by those skilled in the art that variations of the described embodiment may be made to meet the particular needs that may arise on specific nuclear reactor designs. With reference to FIG. 1, for example, if a higher pressure differential across the panel 28 is required than that corresponding to the pressure drop between the upstream end of the core and the core midplane, the second end of the conduit 32 may be located in the vicinity of the inlet nozzle 24 rather than at the upstream end of the shroud. This arrangement might require the conduit to penetrate the core support barrel 18, but the system would nevertheless be passive and automatic.

I claim:

1. A core alignment shroud for insertion in a nuclear reactor vessel, the reactor vessel having means for introducing a flow of coolant through the reactor core, comprising:

an elongated, hollow frame for mounting in the vessel, the frame having an inner surface closely conforming in shape to the lateral perimeter of the core;

a flexible panel sealingly attached along its edges to the inner surface of the frame to form a chamber therebetween;

conduit means having a first end opening into the chamber and a second end adapted for fluid communication with the reactor coolant at a location upstream of the core, such that when the shroud is in the vessel and reactor coolant is flowing, the pressure of the fluid upstream of the core is higher than the pressure acting on the outer surface of the panel creating a pressure differential across the panel which deflects the panel inwardly against the core.

2. The alignment shroud of claim 1 wherein a plurality of panels are located around the inner surface of the frame approximately equidistant from the upper and lower ends of the frame.

3. The alignment shroud of claim 2 wherein the conduit extends downwardly along the outer surface of the frame and the second end of the conduit is located near the lower end of the frame.

4. The alignment shroud of claim 2 wherein the panels cover recesses in the inner surface of the frame.

5. The alignment shroud of claim 4 wherein each panel includes adjustable stop means for limiting the deflection of the panel.

6. A system for preventing bowing of a nuclear reactor core having a flow of coolant therethrough and a plurality of fuel assemblies each having a plurality of longitudinally spaced grids, comprising:
- a rigid shroud surrounding the core and having an elongated, hollow frame including an inner surface closely conforming in shape to the lateral perimeter of the core;
- a plurality of flexible panels sealingly attached to the inner surface of the frame to form a chamber therebetween, each panel located at an elevation on the frame opposite a grid on a peripheral fuel assembly;
- conduit means having a first end opening into the chamber and a second end located upstream of the core and in fluid communication with the reactor coolant at a location remote from the panel;
- such that when reactor coolant is flowing the pressure upstream of the core is higher than the pressure acting on the outersurface of the panel creating a pressure differential across the panel which deflects the panel inwardly against the core.

7. The system of claim 6 wherein the second end of the conduit is in fluid communication with the reactor coolant at a location adjacent to the upstream end of the core.

8. The system of claim 6 wherein the conduit extends downwardly along the outer surface of the shroud and the second end of the conduit penetrates the shroud frame to form an opening in the shroud adjacent to the upstream end of the core.

9. The system of claim 6 further comprising stop means associated with the panel and the frame for limiting the deflection of the panel in the direction of the core.

10. The system of claim 6 wherein the panels cover recesses in the inner surface of the frame.

11. The system of claim 6 or 10 wherein the panels are welded along their edges to the frame.

12. The system of claim 9 wherein the stop means are adjustable.

* * * * *